(12) United States Patent
Sun

(10) Patent No.: US 9,643,299 B2
(45) Date of Patent: May 9, 2017

(54) RATCHET DEVICE AND SCREWDRIVER

(71) Applicant: SHANGHAI EASY-USE TOOLS ENTERPRISE CO. LTD., Shanghai (CN)

(72) Inventor: Shiyu Sun, Shanghai (CN)

(73) Assignee: SHANGHAI EASY-USE TOOLS ENTERPRISE CO., LTD., Shanghai (CN)

( * ) Notice: Subject to any disclaimer, the term of this patent is extended or adjusted under 35 U.S.C. 154(b) by 322 days.

(21) Appl. No.: 14/421,585

(22) PCT Filed: Jul. 7, 2014

(86) PCT No.: PCT/CN2014/081761
§ 371 (c)(1),
(2) Date: Feb. 13, 2015

(87) PCT Pub. No.: WO2015/103858
PCT Pub. Date: Jul. 16, 2015

(65) Prior Publication Data
US 2016/0001428 A1   Jan. 7, 2016

(30) Foreign Application Priority Data

Jan. 13, 2014 (CN) .......................... 2014 1 0014724

(51) Int. Cl.
B25B 15/04 (2006.01)
F16D 41/12 (2006.01)
F16D 41/18 (2006.01)

(52) U.S. Cl.
CPC ............ *B25B 15/04* (2013.01); *F16D 41/125* (2013.01); *F16D 41/185* (2013.01)

(58) Field of Classification Search
CPC ...... B25B 15/04; F16D 41/125; F16D 41/185
See application file for complete search history.

(56) References Cited

U.S. PATENT DOCUMENTS

| 6,058,812 | A | * | 5/2000 | Casel | .................... B25B 13/466 81/60 |
| 6,082,226 | A | * | 7/2000 | Lin | ....................... B25B 13/465 192/43.1 |
| 6,622,597 | B2 | * | 9/2003 | Chen | .................... B25B 13/466 81/438 |
| 6,935,211 | B2 | * | 8/2005 | Chen | ....................... B25B 15/04 81/438 |

(Continued)

Primary Examiner — David B Thomas
(74) Attorney, Agent, or Firm — Myron Greenspan; Lackenbach Siegel LLP

(57) ABSTRACT

The present invention discloses a ratchet device, cylindrical through holes are arranged at the center of the pawl base and switch-shift cover, the rod body passes through the cylindrical through hole of the pawl base and switch-shift cover, two oblique openings are arranged on the pawl base, a transverse slot is arranged on one side of the periphery of the pawl base, a ratchet base is arranged on the rod body, a ratchet is arranged at one end of the periphery of the ratchet base, the claw of the pawl engages with the ratchet of the ratchet base in an up-down way, a flange is arranged on the external of the pawl. The ratchet structure is configured to achieve the up-and-down motion on the vertical direction, which is convenient for users, easy to use, excellent in saving strength and in improving work efficiency.

16 Claims, 4 Drawing Sheets

(56) References Cited

U.S. PATENT DOCUMENTS

| | | | |
|---|---|---|---|
| 7,107,876 B1 * | 9/2006 | Chen | B25B 15/04 192/43.2 |
| 7,207,243 B1 * | 4/2007 | Lee | B25B 15/04 81/58.3 |
| 8,272,298 B2 * | 9/2012 | Chen | B25B 13/463 81/63.1 |
| 2005/0211027 A1 * | 9/2005 | Shu | B25B 15/04 81/60 |
| 2010/0180732 A1 * | 7/2010 | Gauthier | B25B 17/00 81/60 |

* cited by examiner

RATCHET DEVICE AND SCREWDRIVER

CROSS REFERENCE TO RELATED APPLICATION

The present application claims priority to and the benefit of Chinese Patent Application No. CN2014/081761, filed on Jul. 7, 2014, and Chinese Patent Application No. CN2014/10014724.1 filed Jan. 13, 2014 the entire contents of which is incorporated herein by reference.

BACKGROUND OF THE INVENTION

1. Field of the Invention

The present invention relates to a screwdriver, more specifically, to a ratchet device and screwdriver.

2. Description of the Related Art

Currently, screwdrivers are used for fastening or loosing screws, which bring a great convenience for people. In the prior art, a screwdriver comprises a screwdriver handle, a screwdriver body and a screwdriver head. The screwdriver body and the screwdriver head are immobilized in one piece. People should keep loosing and fastening their hands when they use this screwdriver, which enables the hands in a suitable place to exert force. However, these motions will be likely to cause the screwdriver head to be broken away from the screw, and thus operation to the screwdriver is quite inconvenient.

The Chinese patent (application number: 201010107089.3 application date: 2010 Feb. 8) disclosed a ratchet screwdriver in which a ratchet is arranged. The ratchet screwdriver comprises a pawl base, a ratchet shaft, a outer clamping ring and two pawls; wherein the two sides of a central shaft hole of an annular body of the pawl base are respectively provided with an installation opening for mounting, the pawls, the pawls are respectively arranged in the installation openings; the ratchet shaft, the outer clamping ring and the pawl base are connected into a whole by the ratchet shaft. The pawls are in the shape of arch type and are provided with dummy clubs and ratchets. The ratchet shaft is provided with strip teeth. Compression springs enabling the ratchets to be engaged with the strip teeth are respectively arranged in the installation openings. The inner surface of the outer clamping ring is provided with two notches. An inclined plane is arranged on the notches. When the outer clamping ring is rotated towards one side, the inclined plane can oppress the dummy club on one of the pawls so that the ratchets on the pawl can be disengaged from the strip teeth.

Therefore, most of the screwdrivers oppress the pawl by using the recess opening of the outer clamping ring, thereby disengaging the ratchet from the strip teeth.

SUMMARY OF THE INVENTION

To solve the technical problems in the existing screwdrivers, the present invention provides a ratchet device, comprising a pawl base, a rod body, a pawl, a spring and a switch-shift cover, wherein: cylindrical through holes are arranged at the center of the pawl base and switch-shift cover, the rod body passes through the cylindrical through hole of the pawl base and switch-shift cover, two oblique openings are arranged on the pawl base, a transverse slot is arranged on one side of the periphery of the pawl base, a ratchet base is arranged on the rod body, a ratchet is arranged at one end of the periphery of the ratchet base, the claw of the pawl engages with the ratchet of the ratchet base in an up-down way, a flange is arranged on the external of the pawl, the pawl is inlayed in the oblique opening, a recess opening is arranged in the switch-shift cover, when the switch-shift cover is rotated, the recess opening of the switch-shift cover oppresses the flange, so that the spring is retracted by stress and the pawl moves downward, and the claw of the pawl is separated from the ratchet, the ratchet device will rotate clockwise or anti clockwise.

According to an embodiment of the present invention, wherein, the cylindrical through hole arranged at the center of the pawl base and the cylindrical though hole arranged at switch-shift cover are concentric.

According to an embodiment of the present invention, wherein, the spring is a symmetry bending bar-type spring.

According to an embodiment of the present invention, wherein, the inclined angle of the oblique opening is configured to enable the claw obliquely arranged on the pawl to engage with the ratchet of the ratchet base.

According to an embodiment of the present invention, wherein, the claw is obliquely arranged on the pawl in a certain angle.

According to an embodiment of the present invention, wherein, a shape of the pawl is matched with a shape of the oblique opening.

According to an embodiment of the present invention, wherein, a depth of the transverse slot is slightly larger than a width of the spring.

According to an embodiment of the present invention, wherein, the flange of the pawl is a cylinder structure.

A ratchet screwdriver, comprising any one of the ratchet device as mentioned above.

The positive effects of the above technical solutions are as follows:

The ratchet structure is configured to achieve the up-and-down motion on the vertical direction. Compared with the existing art that outer clamping ring oppresses the ratchet, the ratchet device in the present invention is easy to use, convenient for the users, excellent in saving strength and in improving work efficiency.

BRIEF DESCRIPTIONS OF THE DRAWINGS

The accompanying drawings, together with the specification, illustrate exemplary embodiments of the present disclosure, and, together with the description, serve to explain the principles of the present disclosure.

DETAILED DESCRIPTIONS

Figure 1:
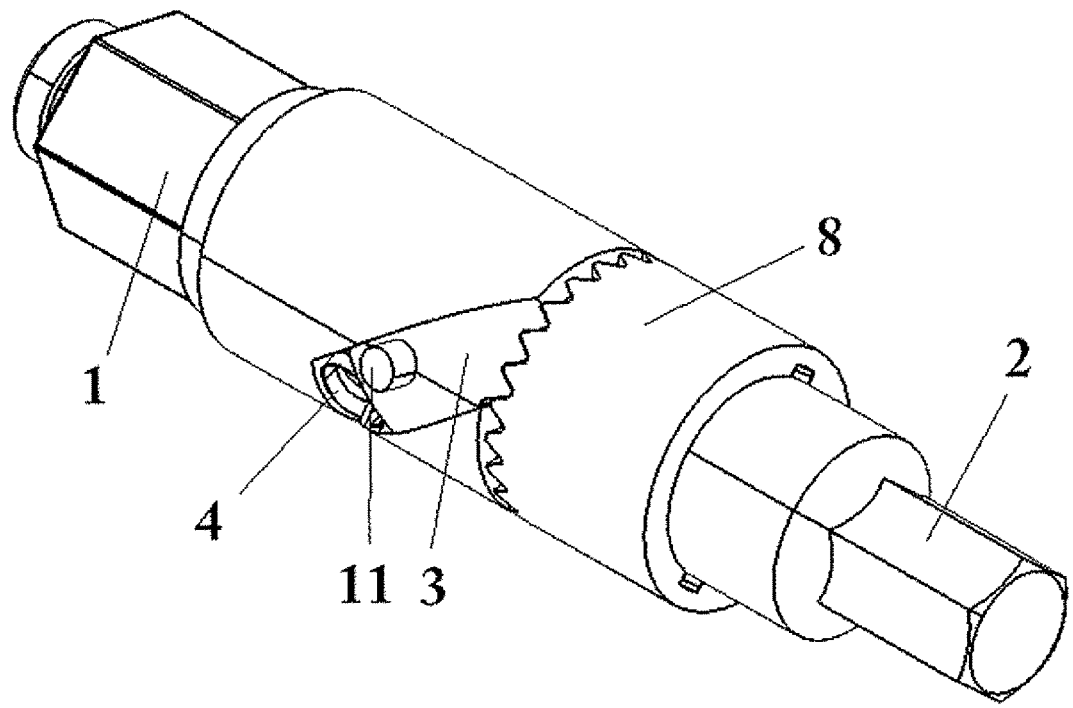
FIG. 1 illustrates a three-dimensional view of a ratchet device of the present invention.

The present disclosure will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the term "plurality" means a number greater than one.

Hereinafter, certain exemplary embodiments according to the present disclosure will be described with reference to the accompanying drawings.

Embodiment 1

As shown in FIGS. 1 to 4, a ratchet device, comprising a Pawl Base 1, a Rod Body 2, a Pawl 3, a Spring 4 and a Switch-shift Cover 5. Cylindrical through holes are arranged at the center of Pawl Base 1 and Switch-shift Cover 5, Rod Body 2 passes through the cylindrical through hole of Pawl Base 1 and Switch-shift Cover 5, two Oblique Openings 6 are arranged on Pawl Base 1, a Transverse Slot 7 is arranged on one side of the periphery of Pawl Base 1, a Ratchet Base 8 is arranged on Rod Body 2, a Ratchet 9 is arranged at one end of the periphery of Ratchet Base 8, Claw 10 of Pawl 3 engages with Ratchet 9 of the Ratchet Base 8 in an up-down way, Spring 4 is mounted below Pawl 3 and is inlayed into Transverse Slot 7, a Flange 11 is arranged on the external of Pawl 3, Pawl 3 is inlayed in Oblique Opening 6, a Recess Opening 12 is arranged in Switch-shift Cover 5, when Switch-shift Cover 5 is rotated, the Recess Opening 12 of Switch-shift Cover 5 oppresses Flange 11, so that Spring 4 is retracted by stress and Pawl 3 moves downward, and Claw 10 of Pawl 3 is separated from Ratchet 9, the ratchet device will rotate clockwise or anti clockwise.

The present invention also includes the following embodiments, as shown in FIGS. 1 to 4, In one of the preferred embodiments, the cylindrical through hole arranged at the center of Pawl Base 1 and the cylindrical through hole arranged at Switch-shift Cover 5 are concentric.

In one of the preferred embodiments, Spring 4 is a symmetry bending bar-type spring.

In one of the preferred embodiments, the inclined angle of Oblique Opening 6 is configured to enable Claw 10 obliquely arranged on Pawl 3 to engage with Ratchet 9 of Ratchet Base 8.

In one of the preferred embodiments, Claw 10 of Ratchet 3 is obliquely arranged on Pawl 3 in a certain angle.

In one of the preferred embodiments, the shape of Ratchet 3 is matched with the shape of Oblique Opening 6.

In one of the preferred embodiments, the depth of Transverse Slot 7 is slightly larger than the width of Spring 4.

In one of the preferred embodiments, Flange 11 of Pawl 3 is a cylinder structure.

The users can understand the function and characteristic of the present invention by reading the contents as follows:

FIG. 1 illustrates a three-dimensional view of the ratchet device of the present invention. As shown in FIG. 1, Body Rod 2 passes through the Pawl Base 1 and the Switch-shift Cover 5. Pawl Base 1 is provided with Oblique Opening 6. Pawl 3 is inlayed in the Oblique Opening 6. Claw 10 of Pawl 3 is engaged with Ratchet 9 of Ratchet Base 8. The bottom of Pawl 3 is provided with Spring 4.

Figure 2:
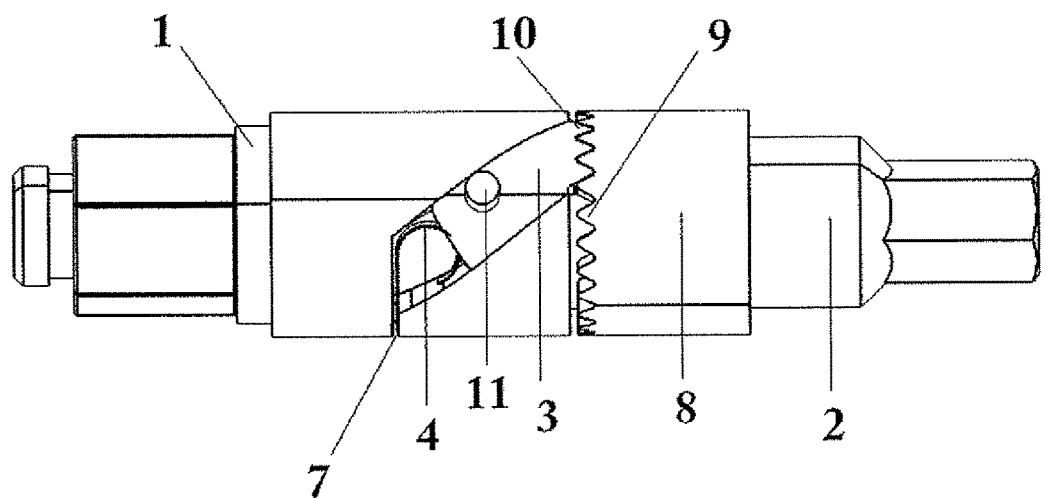
FIG. 2 illustrates a front view of a ratchet device of the present invention.
Figure 3:
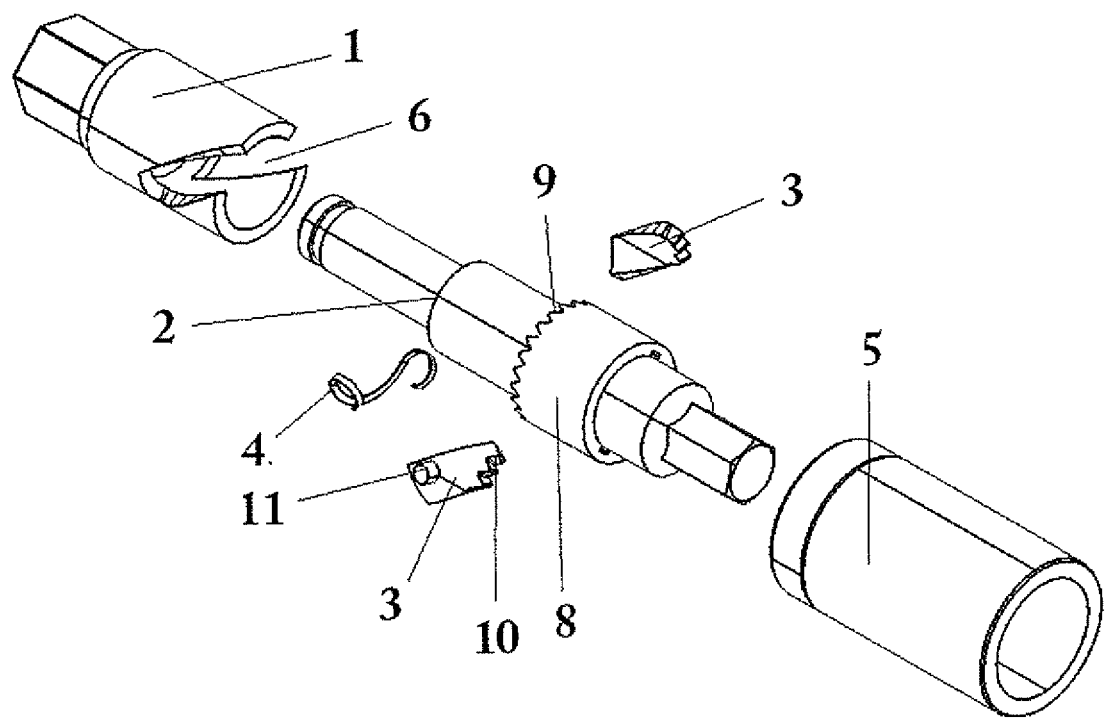
FIG. 3 illustrates an exploded view of a ratchet device of the present invention.
Figure 4:
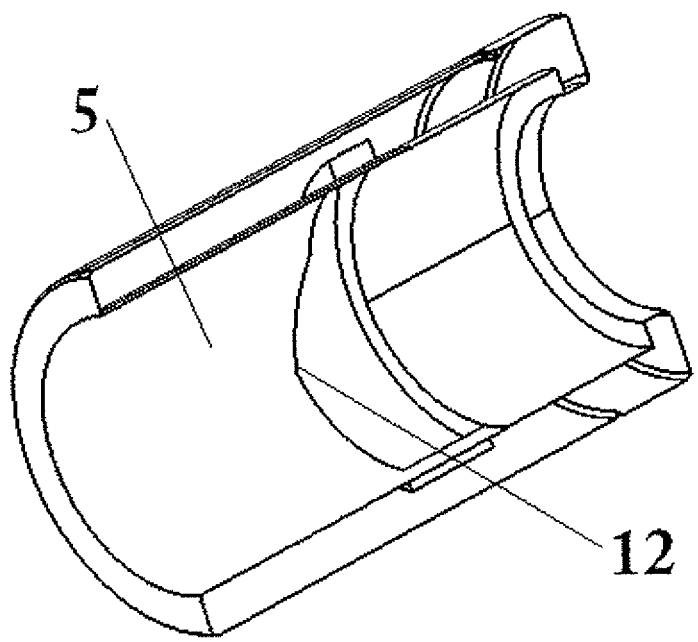
FIG. 4 illustrates a cross-section view of the switch-shift cover of a ratchet device of the present invention.

FIG. 2 illustrate a front view of the ratchet device of the present invention. The inner wall of Switch-shift Cover 5 is arranged with a Recess Opening 12 opposite to Flange 11 of Claw 3. Recess Opening 12 can oppress Flange 11 on Pawl 3 to perform clockwise or anticlockwise movement. The user can rotate Switch-shift Cover 5 clockwise. Recess Opening 12 in Switch-shift Cover 5 oppresses Flange 11 downward. Spring 4 is retracted by stress and Pawl 3 moves downward. When Claw 10 of Pawl 3 is separated from Ratchet 9, the ratchet device will perform clockwise or anti clockwise movement. Similarly, when the anti clockwise movement is performed, Recess Opening 12 at the other side of Switch-shift Cover 5 oppresses Flange 11 at the another side of Pawl 3, so that Claw 10 on Pawl 3 is separated from Ratchet 9 on Ratchet Base 8, i.e., the ratchet device can be moved in anti clockwise.

Embodiment 2

Figure 5:
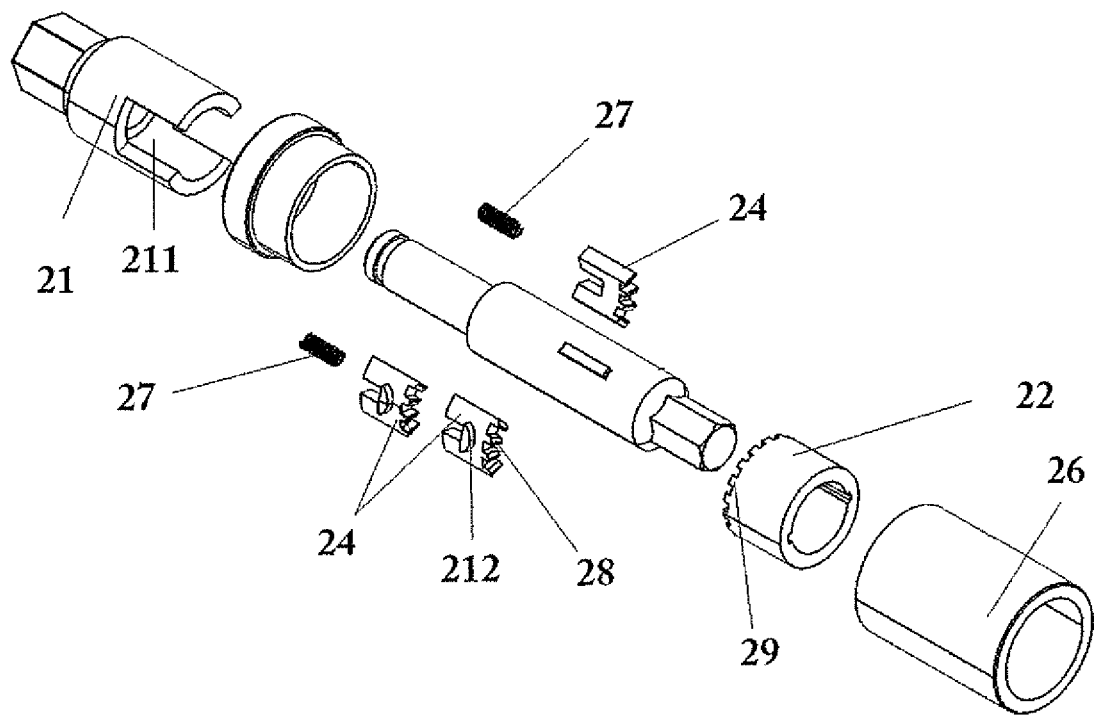
FIG. 5 illustrates an exploded view of the ratchet device in Embodiment 2 of the present invention.

FIG. 5 illustrates a structure view of the ratchet device of one of the embodiments of the present invention. In the present embodiment, the shape of Pawl 24 is rectangle, Claw 28 of Pawl 24 is horizontally arranged on the top of Rectangle Pawl 24, the opening of Pawl Base 21 is a Rectangle Opening 211 which is matched with Rectangle Pawl 24, the bottom of Rectangle Pawl 24 is installed with a Spring 27, the recess opening of Switch-shift Cover 26 had been relatively changed according to Semicircle 212 on Rectangle Pawl 24, the principle of the present embodiment is the same as that of Embodiment 1. When Switch-shift Cover 26 is rotated clockwise, the recess opening in Switch-shift Cover 26 oppresses Semicircle Flange 212 downward, Spring 27 is retracted by stress and Pawl 24 moves downward, and Claw 28 of the Rectangle Pawl 24 is separated from Ratchet 29, the ratchet device will move clockwise. Similarly, when the anti clockwise movement is performed, the recess opening at the other side of Switch-shift Cover 26 oppresses Semicircle Flange 212 at the other side of Rectangle Pawl 24, so that Claw 212 on Rectangle Pawl 24 is separated from Ratchet 29 on Ratchet Base 22, i.e., the ratchet device can be moved in anti clockwise.

Embodiment 3

Figure 6:
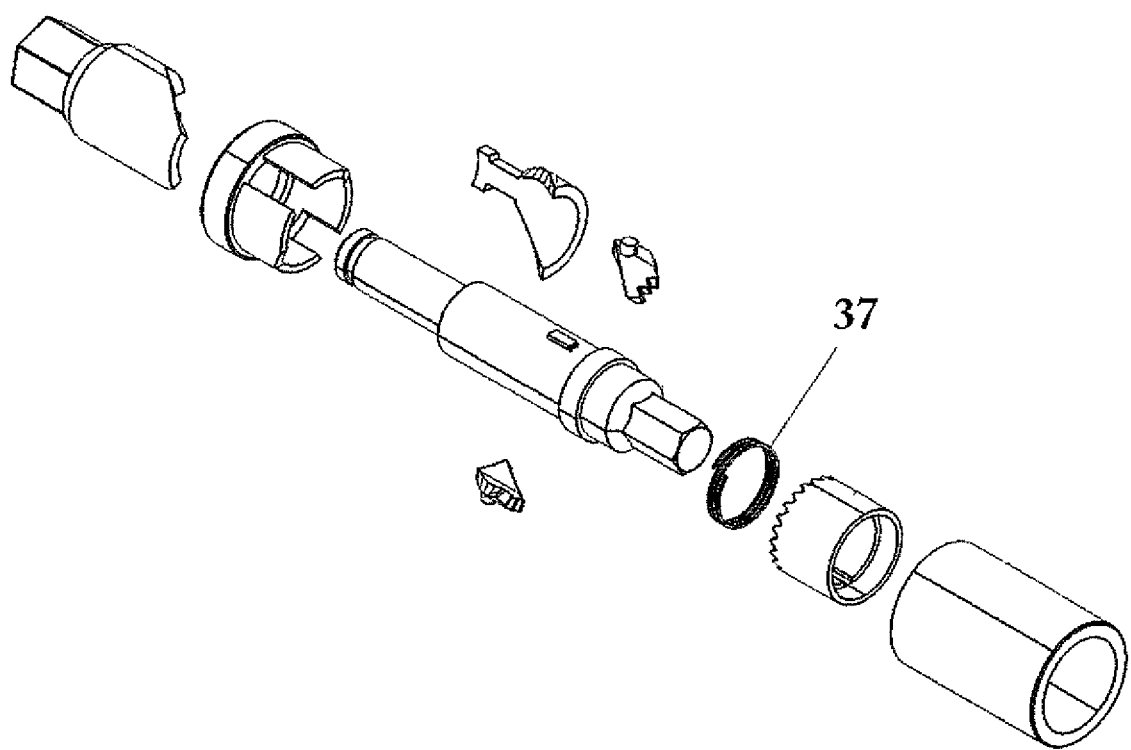
FIG. 6 illustrates an exploded view of the ratchet device in Embodiment 3 of the present invention.

FIG. 6 illustrates an exploded view of the ratchet device of the present invention. The only difference between this embodiment and Embodiments 1 to 2 is the shape and the position of the spring. The spring in this embodiment is a Circular Spring 37, the shape of Circular Spring 37 is the same as the inner diameter of Ratchet Base 32, and Circular Spring 37 is arranged at the upper of Ratchet Base 22. The principle of this embodiment is the same as that of Embodiments 1 and 2.

While the present disclosure has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A ratchet device, comprising a pawl base, a rod body, a pawl, a spring and a switch-shift cover, wherein, cylindrical through holes are arranged at the center of the pawl base and switch-shift cover, the rod body passes through the cylindrical through hole of the pawl base and switch-shift cover, two oblique openings are arranged on the pawl base, a transverse slot is arranged on one side of the periphery of the pawl base, a ratchet base is arranged on the rod body, a ratchet is arranged at one end of the periphery of the ratchet base, the claw of the pawl engages with the ratchet of the ratchet base in an up-down way, a flange is arranged on the external of the pawl, the pawl is inlayed in the oblique opening, a recess opening is arranged in the switch-shift cover, when the switch-shift cover is rotated, the recess opening of the switch-shift cover oppresses the flange, so that the spring is retracted by stress and the pawl moves downward, and the claw of the pawl is separated from the ratchet, the ratchet device will rotate clockwise or anti clockwise.

2. The ratchet device of claim 1, wherein, the cylindrical through hole arranged at the center of the pawl base and the cylindrical though hole arranged at switch-shift cover are concentric.

3. The ratchet device of claim 1, wherein, the spring is a symmetry bending bar-type spring.

4. The ratchet device of claim 1, wherein, the inclined angle of the oblique opening is configured to enable the claw obliquely arranged on the pawl to engage with the ratchet of the ratchet base.

5. The ratchet device of claim 1, wherein, the claw is obliquely arranged on the pawl in a certain angle.

6. The ratchet device of claim 1, wherein, a shape of the pawl is matched with a shape of the oblique opening.

7. The ratchet device of claim 1, wherein, a depth of the transverse slot is slightly larger than a width of the spring.

8. The ratchet device of claim 1, wherein, the flange of the pawl is a cylinder structure.

9. A ratchet screwdriver, comprising a ratchet device having a pawl base, a rod body, a pawl, a spring and a switch-shift cover, wherein, cylindrical through holes are arranged at the center of the pawl base and switch-shift cover, the rod body passes through the cylindrical through hole of the pawl base and switch-shift cover, two oblique openings are arranged on the pawl base, a transverse slot is arranged on one side of the periphery of the pawl base, a ratchet base is arranged on the rod body, a ratchet is arranged at one end of the periphery of the ratchet base, the claw of the pawl engages with the ratchet of the ratchet base in an up-down way, a flange is arranged on the external of the pawl, the pawl is inlayed in the oblique opening, a recess opening is arranged in the switch-shift cover, when the switch-shift cover is rotated, the recess opening of the switch-shift cover oppresses the flange, so that the spring is retracted by stress and the pawl moves downward, and the claw of the pawl is separated from the ratchet, the ratchet device will rotate clockwise or anti clockwise.

10. The ratchet screwdriver of claim 9, wherein, the cylindrical through hole arranged at the center of the pawl base and the cylindrical though hole arranged at switch-shift cover are concentric.

11. The ratchet screwdriver of claim 9, wherein, the spring is a symmetry bending bar-type spring.

12. The ratchet screwdriver of claim 9, wherein, the inclined angle of the oblique opening is configured to enable the claw obliquely arranged on the pawl to engage with the ratchet of the ratchet base.

13. The ratchet screwdriver of claim 9, wherein, the claw is obliquely arranged on the pawl in a certain angle.

14. The ratchet screwdriver of claim 9, wherein, a shape of the pawl is matched with a shape of the oblique opening.

15. The ratchet screwdriver of claim 9, wherein, a depth of the transverse slot is slightly larger than a width of the spring.

16. The ratchet screwdriver of claim 9, wherein, the flange of the pawl is a cylinder structure.

* * * * *